(12) United States Patent
Haartsen

(10) Patent No.: US 6,928,085 B2
(45) Date of Patent: Aug. 9, 2005

(54) SYSTEM AND METHOD FOR PROVIDING QUALITY OF SERVICE AND CONTENTION RESOLUTION IN AD-HOC COMMUNICATION SYSTEMS

(75) Inventor: Jacobus Haartsen, Hardenberg (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 862 days.

(21) Appl. No.: 09/804,288

(22) Filed: Mar. 12, 2001

(65) Prior Publication Data

US 2002/0126692 A1 Sep. 12, 2002

(51) Int. Cl.[7] .............................. H04J 3/02; H04B 7/212
(52) U.S. Cl. ........................ 370/462; 370/347; 709/208
(58) Field of Search ................. 370/294, 230, 370/236, 336, 346, 455, 447, 458, 431, 461, 462, 466, 467, 347; 455/509, 450; 709/236, 226, 229, 208, 104

(56) References Cited

U.S. PATENT DOCUMENTS 4,819,229 A * 4/1989 Pritty et al. .................... 370/89
6,751,213 B1 * 6/2004 Sun et al. ..................... 370/352

* cited by examiner

*Primary Examiner*—Duc Ho
(74) *Attorney, Agent, or Firm*—Potomac Patent Group PLLC (57) ABSTRACT

Systems and methods for providing access to a time-slotted communication channel are disclosed. Access to the channel is granted by possession of a pseudo-token transmitted between communication units with packets, such that the recipient of a data packet receives the pseudo-token with the packet. Communication units may be assigned reserved slots during which the pseudo-token automatically is assigned to the communication unit. Further, communication units may be assigned priority levels according to which contention contests may be resolved. Reserved slots and priority rankings may used in combination to accommodate varying levels of QoS required or requested by communication units on the channel.

31 Claims, 9 Drawing Sheets

SYSTEM AND METHOD FOR PROVIDING QUALITY OF SERVICE AND CONTENTION RESOLUTION IN AD-HOC COMMUNICATION SYSTEMS

BACKGROUND

The present invention relates to electronic communication systems, and more particularly to a contention resolution scheme for an ad-hoc radio channel that supports varying quality of service requirements.

In the last decades, progress in radio and VLSI technology has enabled widespread adoption of radio communication in consumer applications. Portable electronic devices, such as mobile telephones, can now be produced having acceptable cost, size, and power consumption.

Presently, the primary focus of wireless communication technology is on voice communication. This focus will likely expand in the near future to provide inexpensive radio equipment which can be easily integrated into mobile and stationary devices. For instance, radio communication can be used to create wireless data links, thereby reducing the need for cables to connect electronic devices.

Traffic flow in data communications can be highly asymmetric. Data communication applications like downloading web pages and sending e-mail require greater bandwidth in one direction than in the opposite direction. For example, a typical user interaction with the World Wide Web is characterized by relatively low "upstream" bandwidth requirements and relatively high "downstream" bandwidth requirements.

Digital radio systems deployed for cellular phone service originally employed symmetric air interfaces, typically using a Time Division Duplex (TDD) access channel. A symmetric air interface was appropriate for voice services, which accounted for most cellular phone traffic, because traffic flows in voice service are substantially symmetric. In the cordless phone system DECT, additional flexibility was obtained since slots in a frame could be allocated more freely in downlink or uplink direction. However, DECT is based on a hierarchical network structure in which base stations support control and traffic channels based on slots, frames and multiframes.

Recently, a radio interface referred to as Bluetooth was introduced to provide wireless, ad hoc networking between mobile phones, laptop computers, headsets, PDAs, and other electronic devices. Some of the implementation details of Bluetooth are disclosed in this application, while a detailed description of the Bluetooth system can be found in "BLUETOOTH—The universal radio interface for ad hoc, wireless connectivity," by J. C. Haartsen, Ericsson Review No. 3, 1998. Further information about the Bluetooth interface is available on the Official Bluetooth Website on the World Wide Web at http://www.bluetooth.org.

Radio communication systems for personal use differ significantly from radio systems like the public mobile phone network. Public mobile phone networks use a licensed band which is fully controlled by the network operator and provides a substantially interference-free channel. By contrast, personal radio communication equipment operates in an unlicensed spectral band and must contend with uncontrolled interference. One such band is the globally-available ISM (Industrial, Scientific, and Medical) band at 2.45 GHz. The band provides 83.5 MHz of radio spectrum. Since the ISM band is open to anyone, radio systems operating in this band must cope with unpredictable sources of interference, such as baby monitors, garage door openers, cordless phones, and microwave ovens. Interference can be avoided using an adaptive scheme that seeks out an unused part of the spectrum. Alternatively, interference can be suppressed by means of spectrum spreading. In the U.S., radios operating in the 2.45 GHz ISM band are required to apply spectrum-spreading techniques if their transmitted power levels exceed about 0 dBm.

Bluetooth radios use a frequency-hop/time-division-duplex (FH/TDD), spread spectrum channel access scheme. In the United States and in most European countries, Bluetooth radios utilize 79 RF channels spaced 1 MHz apart in the 83.5 MHz ISM band. During a connection, radio transceivers "hop" from one frequency band to another in a pseudo-random fashion. The frequency hopping sequence is determined by the device address of a Bluetooth unit. The time dimension is divided into slots of 625 $\mu$s, resulting in a nominal hop rate of 1600 hops/second. Further, slots are used alternately for transmitting and receiving, resulting in a TDD scheme. These features allow for low-cost, low-power, narrowband transceivers with strong immunity to interference.

One application for Bluetooth-enabled communication units is the replacement of cables that connect computing or communication devices, such as computers, printers, mobile terminals, and the like. To replace cables, the communication channel must be sufficiently flexible to support both symmetric and asymmetric traffic flows and synchronous and asynchronous clocking schemes. Bluetooth radios can provide this flexibility because the communication channel lacks a multi-slot frame structure.

To provide a high degree of data integrity, schemes may be implemented to retransmit data packets that have been received incorrectly by the recipient. Commonly assigned U.S. Provisional Application No. 60/180,095 describes an Automatic Retransmission Query (ARQ) proposal useful in a point-to-point transmission protocol based on a ping-pong channel access scheme. Further, commonly assigned U.S. Provisional Application No. 60/226,965 describes assigning recovery slots to communication units in a ping-pong channel access scheme. Provisional Application Nos. 60/180,095 and 60/226,965 are incorporated by reference in their entirety.

There remains a need in the art for channel access schemes useful in peer-to-peer communications that provide a highly flexible and reliable allocation of channel resources. Further there is a need in the art for a channel access scheme that accommodates varying Quality of Service (QoS) requirements.

SUMMARY OF THE INVENTION

The present invention addresses these and other concerns by providing, in one aspect, a system and method for providing peer-to-peer, ad-hoc communications in which access to the communication channel is regulated by a pseudo-token access scheme, and which provides contention resolution between multiple devices having different QoS requirements.

According to one aspect, access to a communication channel is regulated using a pseudo-token, ping-pong access protocol, in which a communication unit receives the right to transmit on the channel in the form of a "pseudo-token" with the receipt of a data packet. The packet header may include the address of the transmitting unit (i.e., the source) and the receiving unit (i.e., the destination). The packet header may also indicate the packet length or the expected duration of the packet, which may be used to determine the point in time at which the channel will be available to transmit another packet. The receiving unit may use the packet length or duration information to determine when the communication channel will be free for the receiving unit to respond to the transmitting unit, or to originate a transfer to another communication unit on the communication channel. Thus, access to the communication channel is granted by a pseudo-token.

According to another aspect, communication units may be assigned reserved slots, during which the pseudo-token is automatically assigned to the communication unit. Reserved slots may be assigned at a predetermined, constant frequency as a component of an access scheme that accommodates varying QoS requirements among the communication units. Further, reserved slots may be used to restart the ping-pong access scheme in the event of a transmission error.

In yet another aspect, the present invention provides a contention resolution scheme to resolve contention contests when the reserved slot of two or more communication units coincide. Communication units may be assigned priority levels, and contention contests may be resolved by awarding access to the communication channel to the higher priority communication unit.

In a further aspect, the invention provides a method of allocating to communication units transmit time slots in a communication channel. Preferably, the communication channel implements a pseudo-token, ping-pong channel access protocol in which a receiving unit obtains the right to transmit on the channel with the receipt of a data packet. According to the invention, reserved time slots may be allocated to communication units based on QoS requirements associated with the communication units, wherein the pseudo-token is automatically assigned to a communication unit during its reserved time slot. Priority levels may be assigned to communication units transmitting on the communication channel. Then the pseudo-token based channel access scheme is interrupted when a communication unit's reserved time slot is overridden by a transmission from a higher priority communication unit.

According to another aspect, the invention provides a communication system comprising a plurality of communication units. The communication units preferably have a transmitter for transmitting data packets on a time slotted communication channel and a receiver for receiving data packets on the time slotted communication channel. Also, one of the communications units preferably acts as a master communication unit for implementing a pseudo-token, ping-pong channel access protocol in which a receiving unit obtains the right to transmit on the channel with the receipt of a data packet. Preferably, the master communication unit includes a module for allocating reserved time slots to at least one of the communication units based on QoS requirements associated with the communication units, such that the pseudo-token is automatically assigned to a communication unit during its reserved time slot. The master unit also preferably includes a module for assigning priority levels to communication units transmitting on the communication channel, and a module for interrupting the token-based channel access scheme when a communication unit's transmission time slot is overridden by a transmission from a higher priority communication unit.

In yet another aspect, the invention provides a communication device for communicating over a communication channel that implements a pseudo token-based access scheme wherein a receiving communication device obtains the right to transmit on the channel with the receipt of a data packet. The communication device includes a transmitter for transmitting data packets directly to other communication devices on a time-slotted communication channel, a receiver for receiving data packets directly from other communication devices on the time-slotted communication channel, and a controller for controlling access to the time-slotted communication channel during a communication session with another communication device. The controller includes a transmission time slot allocation module for allocating reserved time slots to at least one communication device based on QoS requirements associated with the communication devices, wherein the pseudo-token is automatically assigned to a communication unit during its reserved time slot, a priority assignment module for assigning priority levels to communication devices transmitting on the communication channel, and a token assignment module for interrupting the token-based channel access scheme when a communication device's transmission time slot is overridden by a transmission from a higher priority communication device.

DETAILED DESCRIPTION OF THE INVENTION

Figure 1:
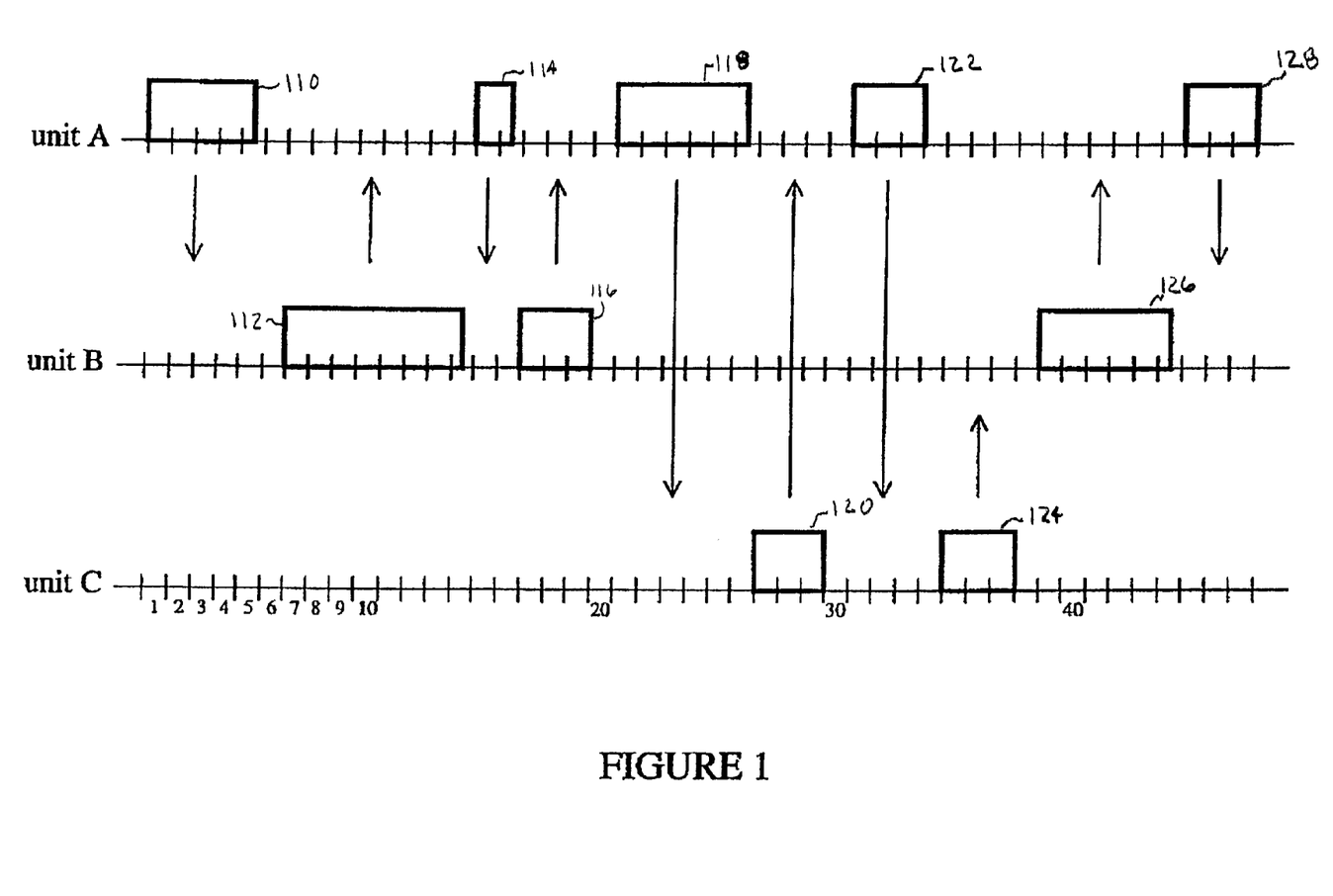
FIG. 1 is a schematic depiction of a token ping-pong channel allocation scheme between three communication units in accordance with the present invention.

FIG. 1 is a schematic illustration of a communication session including three communication units (A, B, C) using a pseudo-token, ping-pong protocol on a time-slotted communication channel. Packets start at a slot boundary and occupy the channel for a period of time. The Bluetooth specification imposes a limit of five (5) time slots per packet, but the present invention is not so limited. Since there is no distinct uplink and downlink in peer communications, the communication channel preferably implements time division duplexing (TDD). Accordingly, only one unit is allowed to transmit at a given time, while other unit(s) listen.

Advantageously, TDD transceivers obviate the need for expensive duplexers, and enable the integration of transmitter and receiver on a single chip, since they never operate simultaneously. TDD results in cost-effective radio equipment.

If the communication channel supports high-speed, asymmetric traffic, then the communication protocol governing the channel preferably allows for the transmission of data packets having a large payload length to reduce the overhead required by the packet header and other supervisory and control signals. However, it will be appreciated that increasing the payload length correspondingly increases the communication channel's vulnerability to transmission errors. At least for data communications, a single error in the payload typically requires the entire payload to be retransmitted. Increasing the size of the payload increases both the statistical probability of a transmission error and the time required to retransmit the payload in the event of a transmission error. Therefore, increasing the payload increases the risk that transmission errors will create significant delays in the communication channel.

Figure 2:
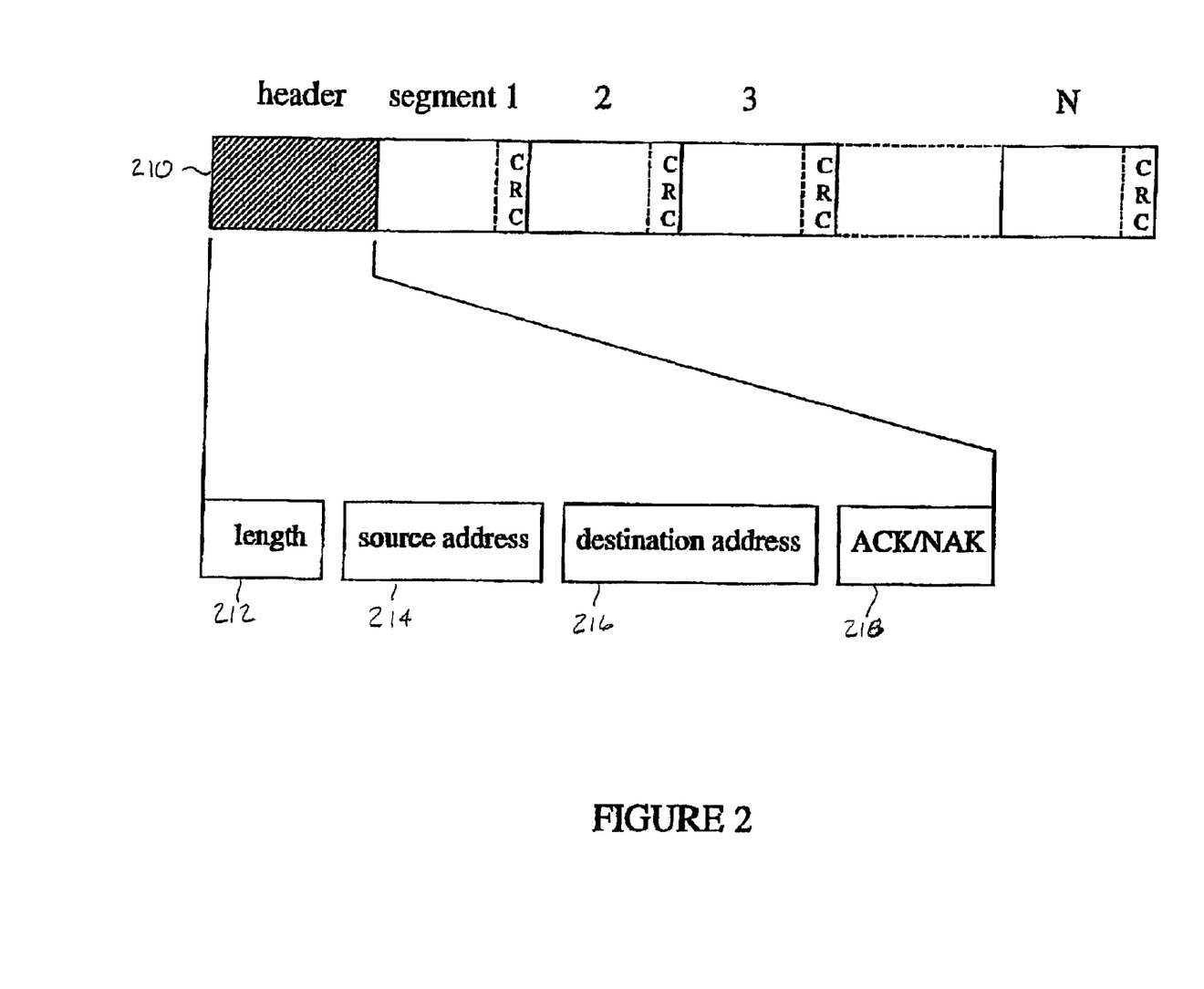
FIG. 2 is a schematic depiction of a communication packet format in accordance with the present invention.

To reduce this risk, the payload may be divided into multiple segments of equal length, as illustrated in FIG. 2. The segments may be used in the retransmission protocol in the event of a transmission error. Referring to FIG. 2, the packet includes a header 210 that includes a packet length data field 212 that may contain a parameter indicating the length of the packet, a source address data field 214 that may contain a parameter indicating the device address of the source, a destination address data field 216 that may contain a parameter indicating the device address of the destination, and an acknowledgment data field 218 that may contain ARQ response information. Each segment is assigned a sequence number (e.g., 1, 2, 3 . . . N) that identifies the segment. In addition, each segment may include a Cyclic Redundancy Check (CRC) or a number of parity bits that may be used to check for transmission errors. In addition to these fields, other fields for support functions can be included, but are not shown.

If the communication channel uses a selective-repeat ARQ protocol as described in U.S. Provisional Application No. 60/180,095, then the number of segments in a packet (and therefore the packet length) may vary extensively. The selective-repeat ARQ scheme tries to send as many segments as the receive buffer can contain. In addition, it will resend only those segments which are notified to be received in error. If the receive buffer cannot be emptied because segments with a lower sequence number have not been received correctly, then the transmitter will resend the missing segments but may not be able to proceed with new segments because the receive buffer is assumed to be full. As a result, the number of payload segments allowed can change considerably between packets.

It will be apparent that the round-trip delay for a segment varies as a function of the number of segments in the packet and the position of the segment in the payload. This is because acknowledgment information is returned in the packet header of the return packet. In addition, the elapsed time before a segment can be retransmitted is determined by the payload length of the return packet, which also may vary widely. These factors create a communication channel subject to highly variable round trip delays.

A pseudo-token, ping-pong channel access protocol in accordance with the present invention accommodates varying packet lengths and variable round-trip delays. In addition, a pseudo-token, ping-pong channel access protocol avoids excessive idle times between transmitting and receiving packets. Random access methods like CSMA/CA could be used, but these methods pose a problem for synchronous and isochronous services, and other services that need to be sent with priority. By contrast, a pseudo-token, ping-pong protocol in accordance with the present invention may be used to support both asynchronous and synchronous services in a radio environment.

According to one aspect of the invention, channel access is granted by the possession of a pseudo-token, which a communication unit obtains with the receipt of a data packet. The packet can be regarded as carrying a token. When a packet is received, the pseudo-token (and the corresponding right to transmit on the channel) is transferred from the sender to the recipient. The recipient can then transmit to any other unit on the communication channel, and the pseudo-token passes to the next recipient. Referring to FIG. 1, communication unit A transmits a packet 110 to unit B, and the pseudo-token passes to unit B. Unit B may then transmit a packet back to unit A, to unit C, or any other communication unit on the channel. In FIG. 1, communication unit B transmits a return packet 112 to communication unit A, which replies to unit B with packet 114. Unit B replies to unit A with packet 116. Unit A then transmits a packet 118 to unit C, which responds to A with packet 120. The communication session may continue indefinitely, with access to the communication channel being provided by the pseudo-token, which is transmitted with the receipt of a data packet. Because channel access is passed back and forth between units, the protocol may be referred to as a "ping-pong" type protocol.

The ARQ protocol described in 60/180,095 can be implemented in a pseudo-token, ping-pong protocol according to the present invention. The ARQ protocol described in 60/180,095 is based on a point-to-point scheme. So the ARQ ACK/NAK information in packet send between units A and B only includes information exchanged between units A and B; it does not include information exchanged between A and C or between B and C. Since the pseudo-token, ping-pong protocol is not limited to point-to-point or point-to-multipoint schemes, source and destination addresses are included in the header, as illustrated in FIG. 2.

According to another aspect of the present invention, the routine "ping-pong" exchange of the pseudo-token can be interrupted by the use of reserved recovery slots, also referred to as reserved slots or priority slots. Communication unit(s) may be assigned reserved time slots on the communication channel, during which time the pseudo-token (and the accompanying right to transmit) is transferred to the communication unit(s) without regard to whether the unit has received a packet.

Figure 3:
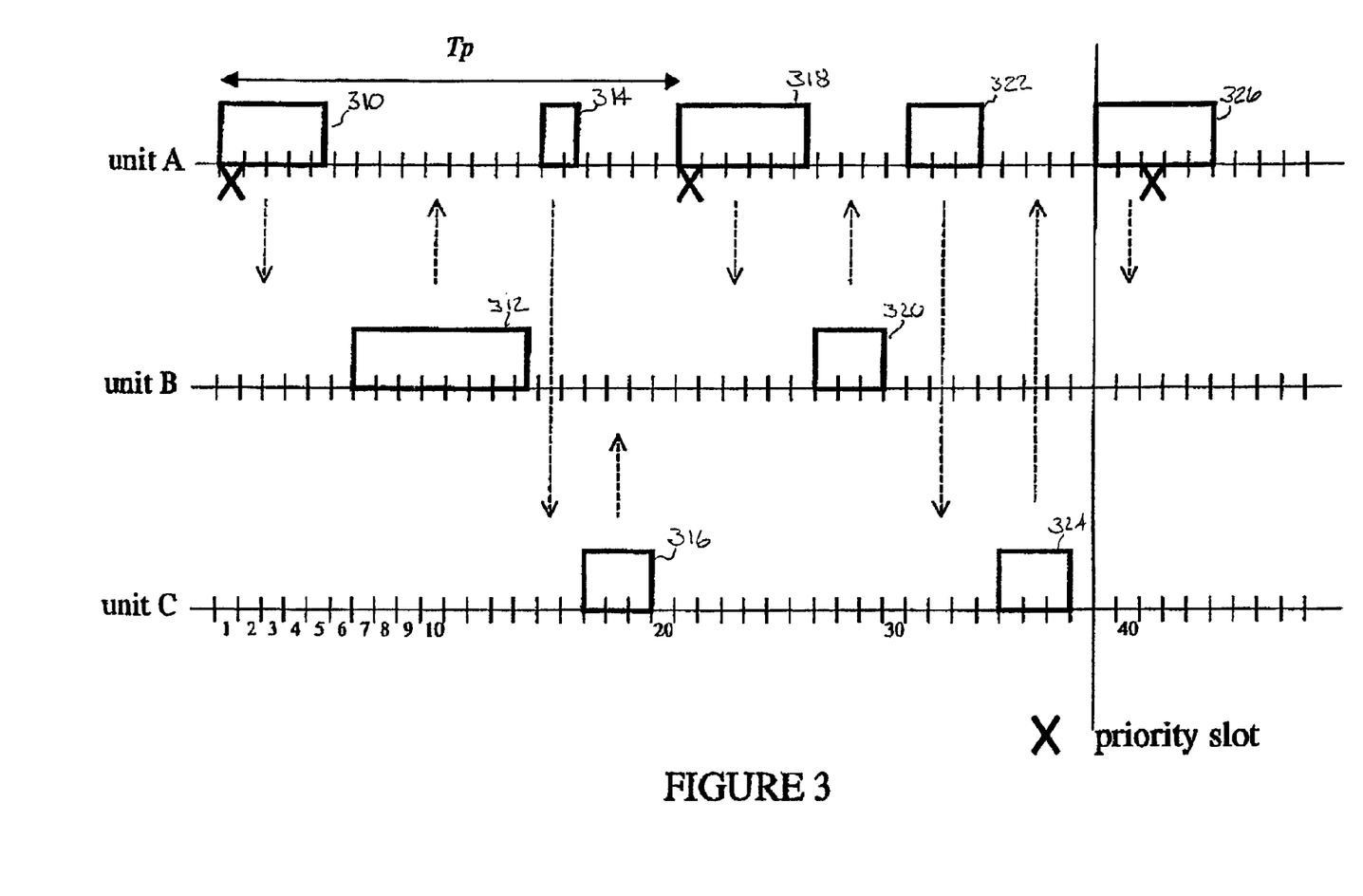
FIG. 3 is a schematic depiction of a token ping-pong channel allocation scheme with priority slots assigned to one unit in accordance with the present invention.

FIG. 3 provides a schematic illustration of the use of reserved slots in a pseudo-token, ping-pong access protocol. Unit A is assigned reserved slots at an interval ($T_p$) of 20 time slots. All other units are prohibited from transmitting during unit A's reserved slots. In FIG. 3, unit A transmits a first packet 310 to unit B, and the pseudo-token is passed to unit B with the packet. Unit B transmits a packet 312 back to unit A, and unit A receives the token with the packet from unit B. A transmits a packet 314 to unit C, and unit C transmits a packet 316 to unit B. Time slot 21 is unit A's reserved slot, so the token automatically passes to unit A at time slot 21. At time slot 21, unit A transmits a packet 318 to unit B, and unit B replies to unit A with packet 320. Unit A receives the pseudo-token with packet 320 and transmits a packet 322 to Unit C. Unit C receives the pseudo-token with packet 322, and replies to unit A with a packet 324. Unit A receives the pseudo-token with packet 324, and sends a packet to unit B beginning at time slot 39.

It will be appreciated that unit A does not have to start transmission on its reserved slot. If transmission starts before the reserved time slot, the unit may simply continue transmitting. For example, as illustrated at time slot 41 in FIG. 3, unit A begins transmission at time slot 39 and simply continues transmitting through its reserved slot at time slot 41. Of course, if the start of a packet is close to a reserved slot, then a unit may decide to delay its transmission to start the packet on its priority slot. Starting packet transmission at a predetermined time ensures that the packet header is transmitted at a known time. This increases the robustness of the system because other units know when to look for the packet header.

Reserved slots have multiple uses in a pseudo-token, ping-pong communication channel access scheme. For example, reserved slots may be used to restart the ping-pong protocol after a transmission failure on the channel. In addition, reserved slots may be used in allocating the channel's capacity to support varying QoS requirements (or requests) associated with the different communication units. The channel capacity reserved to a particular communication unit is a function of the reserved slot interval, e.g., the frequency of reserved slots, and the maximum packet length. Decreasing the reserved slot interval (i.e., increasing the frequency of reserved slots assigned to a communication unit) increases the capacity available to that unit. Similarly, increasing maximum packet length increases the capacity available to a communication unit.

Figure 4:
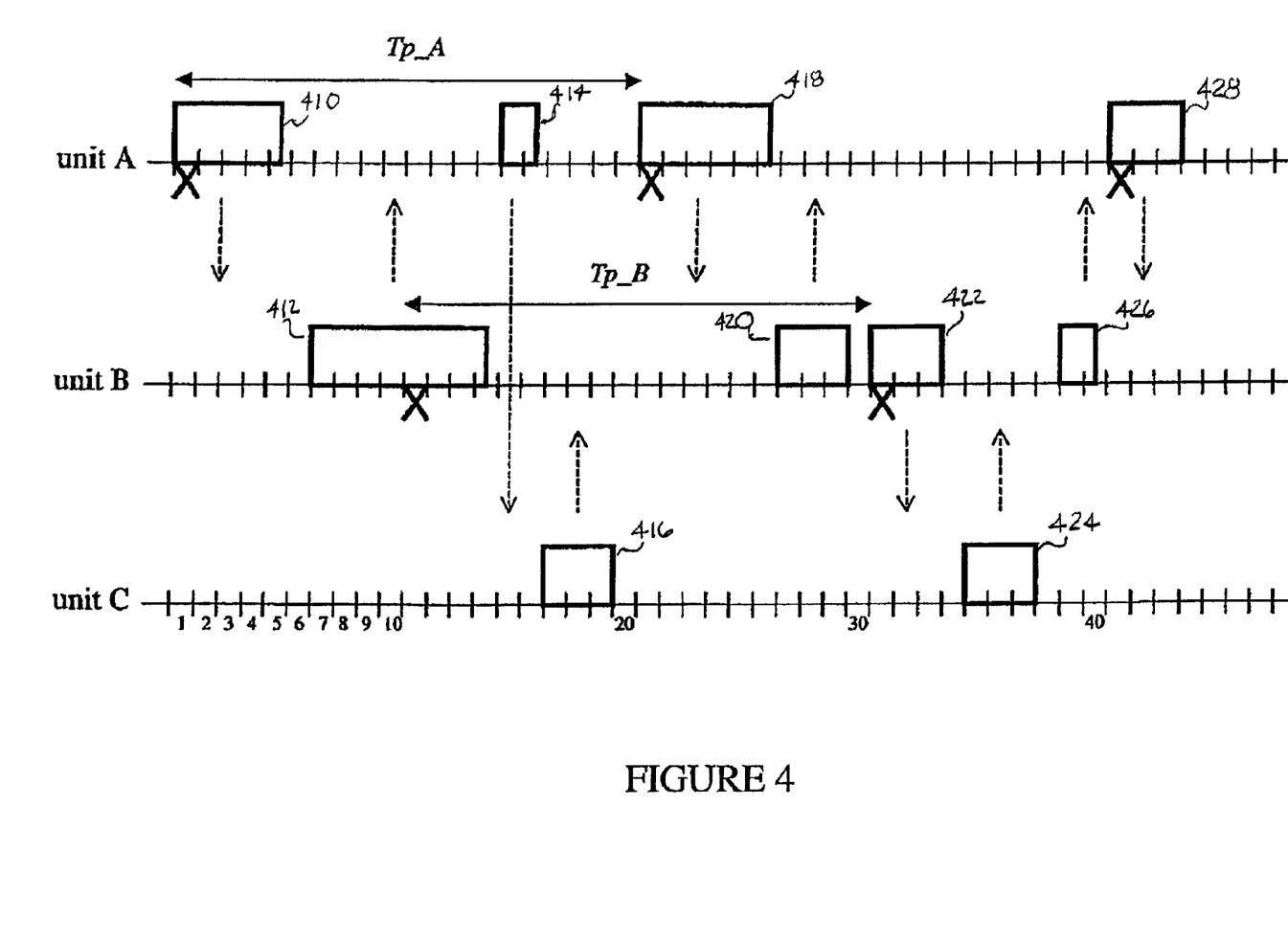
FIG. 4 is a schematic depiction of a token ping-pong channel allocation scheme with priority slots assigned to two units that have the same priority interval in accordance with the present invention.

FIG. 4 presents a schematic depiction of a communication session in which reserved slots have been assigned to unit A and unit B. If multiple units are assigned reserved slots, the slots preferably are offset in time as shown in FIG. 4 to avoid contention over access to the channel. Time staggering is effective in preventing contention in cases where the reserved slot interval $T_p$ is the same for both units (i.e., $T_{p,A}=T_{p,B}$) or when the reserved slot interval of one unit (i.e., $T_{p,A}$) is an integer multiple of another unit (i.e., $T_{p,B}$). Referring to FIG. 4, the reserved slot periods of units A and B are offset by 10 time slots, although other offset values are possible. Preferably, the time between consecutive reserved slots assigned to different units is as large as possible to allow the token ping-pong protocol to operate as freely as possible. However, in some situations, it may be beneficial to keep the offset value small. The leading unit receives the token as frequently as the lagging unit, but must restrict its packet length (and therefore its available capacity) to prevent crossing the reserved slot of the lagging unit.

Referring to FIG. 4, slot 1 is reserved for unit A, which begins a transmission at slot 1. Unit A transmits a packet 410 to B, which receives the pseudo-token with the packet. Unit B begins transmitting a packet 412 to unit A in time slot 7. Unit B is transmitting during its assigned reserved slot at time slot 10, so the transmission continues unaffected. Unit A transmits a packet 414 to unit C beginning at time slot 15, and unit C transmits a packet 416 to unit B beginning at time slot 17. Unit B receives the pseudo-token with the packet 416 transmitted by unit C, but unit A has a reserved slot at time slot 21, so unit A automatically is assigned the pseudo-token. Unit A transmits a packet 418 to unit B, which responds to unit A with packet 420. Unit A receives the pseudo-token with the packet 420 transmitted by unit B, but unit B has a reserved time slot at slot 31, so unit B automatically is assigned the pseudo-token. Unit B transmits a packet 422 to unit C beginning at time slot 31, and the pseudo-token passes to unit C. Unit C transits a packet 424 to unit B beginning at time slot 35, and unit B transmits a packet 426 to unit A beginning at time slot 39. Unit A has possession of the pseudo-token at time slot 41 (which is reserved to A) and transmits a packet 428 to unit B.

Figure 5:
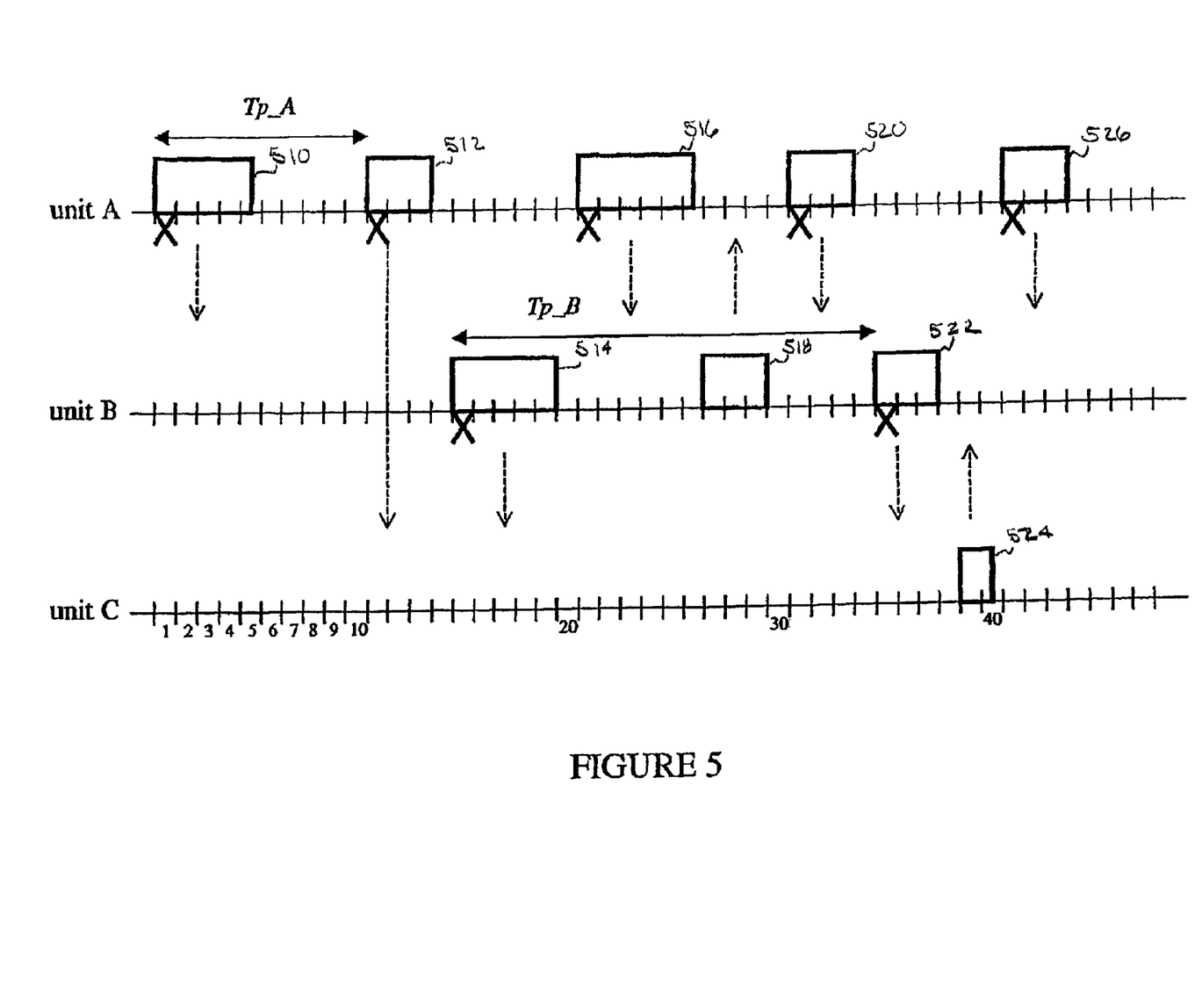
FIG. 5 is a schematic depiction of a token ping-pong channel allocation scheme with priority slots assigned to two units having different priority intervals in accordance with the present invention.

FIG. 5 is a schematic illustration of a communication session in which unit A is assigned twice as many reserved slots as unit B, i.e., where $T_{p,B}=2T_{p,A}$. The reserved slots for unit B are offset in time from the reserved slots of unit A. Because $T_{p,B}$ is an integer multiple of $T_{p,A}$, offsetting the units in time effectively avoids contention for access to the channel for unit A and unit B. Unit A has twice as many opportunities to access the channel than Unit B, and assuming that unit A has a maximum packet size equal to or greater than the maximum packet size for unit B, unit A can provide a higher QoS than unit B. FIG. 5 also illustrates the priority that units with reserved slots (units A and B) get over other units (e.g., unit C). For example, packet 512 sent from unit A to C (starting at slot 11) gives the pseudo-token to unit C. However, because of the reserved slot of unit B at time slot 15, the token is automatically assigned to unit B.

In another aspect, the present invention provides a contention resolution scheme for use when reserved slots for two or more different communication units fall on the same time slot. This may occur, for example, when communication units are assigned reserved slot intervals that are not integer multiples of each other. According to the present invention, communication units with reserved slots are also assigned a priority level, and contention issues are resolved by granting channel access according to the priority levels. Communication units with a higher priority level are allowed to transmit during a reserved slot of a unit with a lower priority level, or over units with no priority assigned. The pseudo-token may be transferred to lower priority units according to their priority level after completion of the higher-priority transmission. Alternatively, lower priority units may simply forfeit their right to channel access when their priority slot is preempted by a transmission from a higher priority communication unit.

Figure 6:
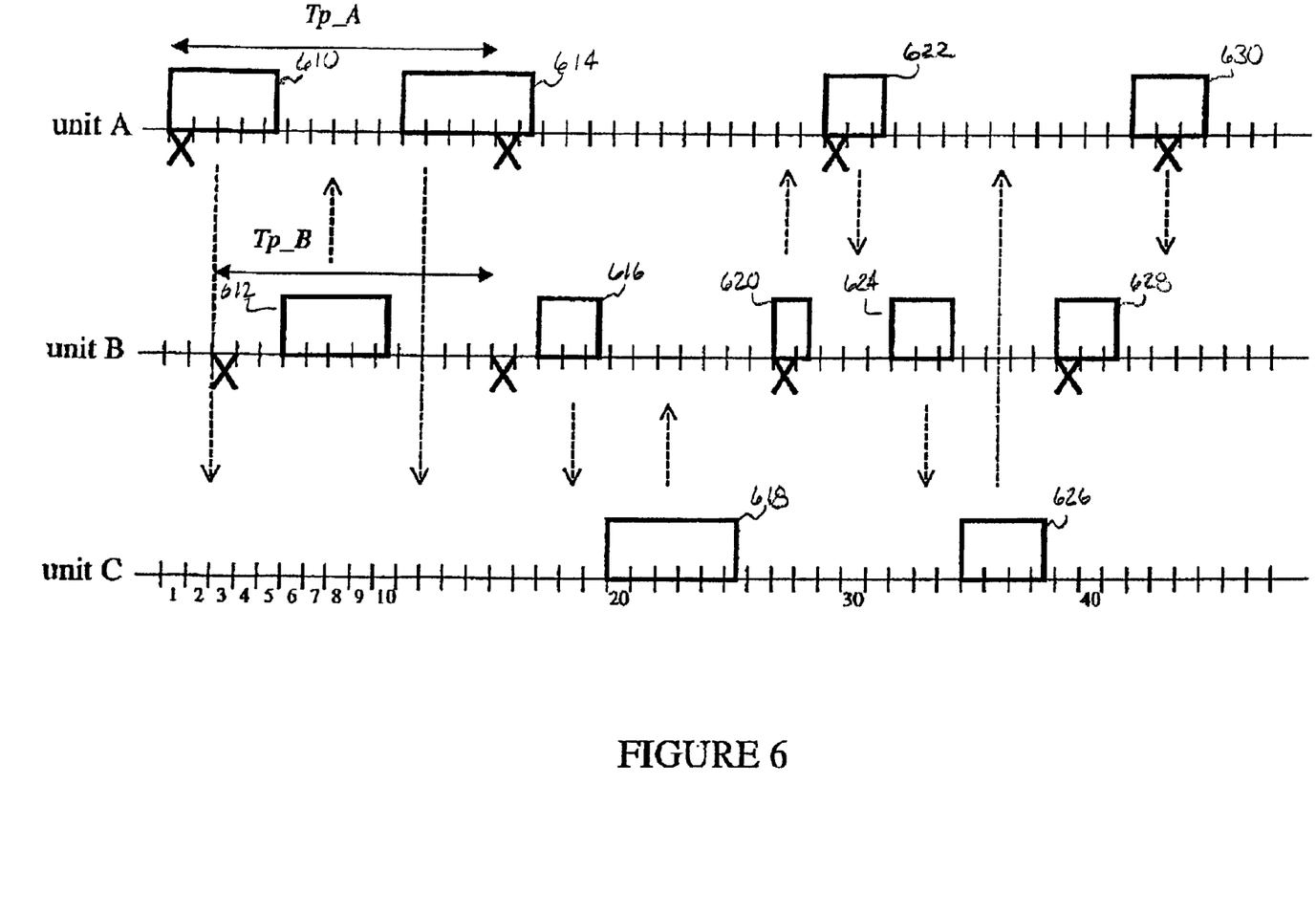
FIG. 6 is a schematic depiction of a token ping-pong channel allocation scheme with priority slots associated to two units having different priority intervals in accordance with the present invention.

FIG. 6 is a schematic illustration of a communication session in units A and B are assigned reserve slots which are not spaced at integer multiples of one another. Therefore the reserve slots will periodically intersect as illustrated at slot 15. In FIG. 6, it is assumed that unit A has the higher priority than unit B, and that unit C has no reserve slots. In time slot 1 unit A sends a packet 610 to unit C. However, because unit A's transmission crosses time slot 6, which is reserved to unit B, the pseudo-token automatically is transferred to unit B after unit A completes the transmission of packet 610. Unit B may begin a transmission as soon as the channel is free, i.e., at the beginning of time slot 6. In an exemplary embodiment, unit B reads the packet header of unit's A transmission to determine how long the packet transmitted by unit A occupies the channel, and starts to transmit when unit A's transmission has finished. Of course, unit B may use other methods to determine when to transmit a signal. For example, in alternate embodiments, unit A (or another communication unit) may broadcast a signal indicating that the channel is free when the transmission is finished, or unit B may monitor the channel to determine when it becomes free. In a Bluetooth network, the master unit may provide a signal indicating when the channel is free.

Unit A transmits a second packet 614 beginning at time slot 11. Units A and B both have reserved slots at time slot 15. Since unit A has priority over unit B, unit A will retain the pseudo-token, and will continue the transmission. However, after unit A has finished its transmission the pseudo-token automatically is assigned to unit B, which transmits a packet 616 beginning at time slot 17. At time slot 27, unit B has another reserved slot and starts transmission. However, it can only send a short packet 620 because the reserved slot of unit A is at time slot 29. Since unit A has higher priority than unit B, unit B is not allowed to continue its transmission over the reserved slot of unit A. The communication session may continue indefinitely in a similar fashion.

Figure 7:
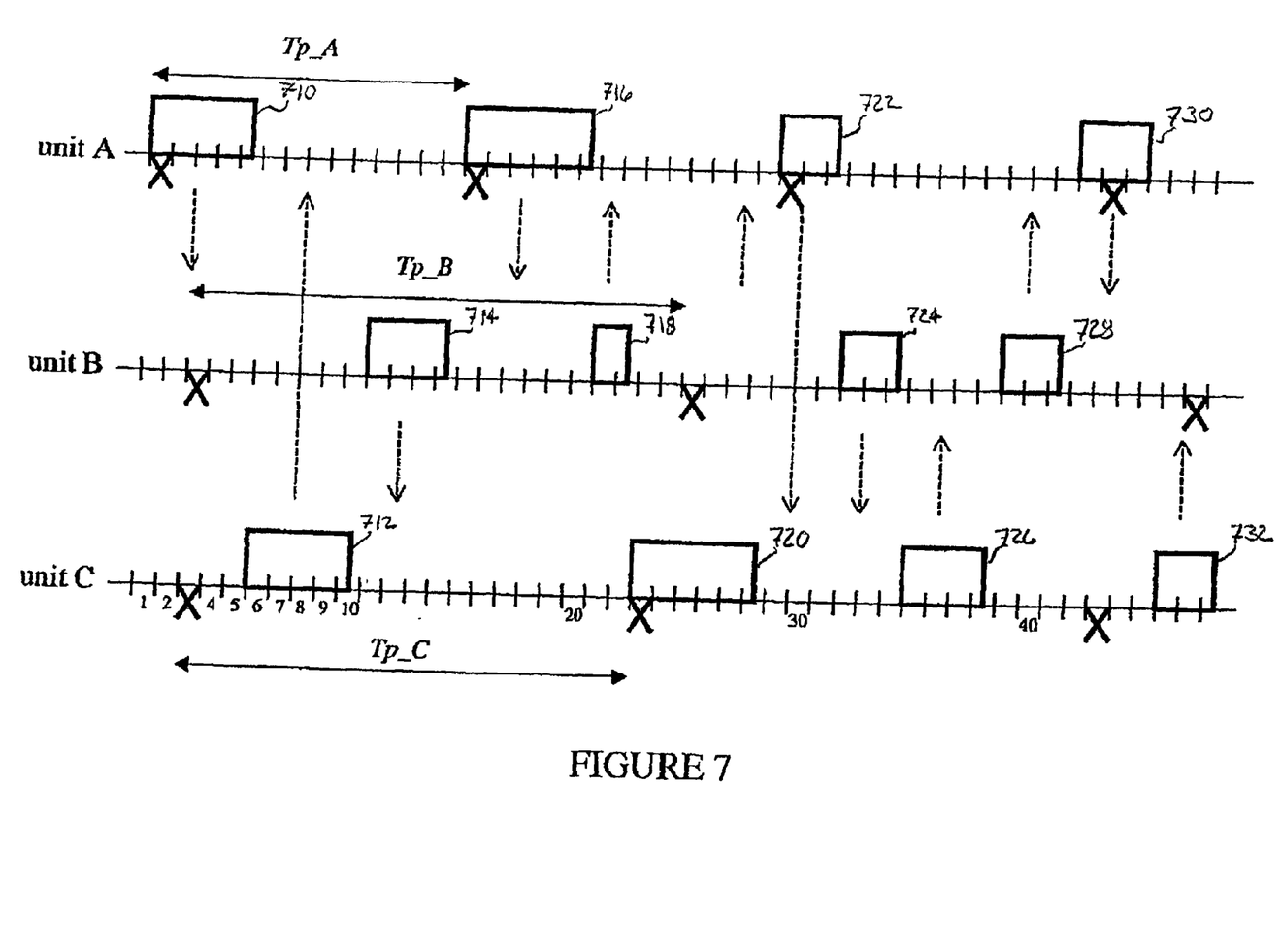
FIG. 7 is a schematic depiction of a token ping-pong channel allocation scheme with priority slots assigned to three units having different priority intervals in accordance with the present invention.

Of course, the proposed scheme can be extended to a communication system in which three or more units have reserved slots. If a reserved slot for unit X is preempted by a transmission by a unit having higher priority, then unit X delays the transmission until transmissions by units with higher priority levels have finished. FIG. 7 is a schematic illustration of a communication session in which all units A, B, and C have reserved slots. It is assumed that unit A has the highest priority level and unit B has the lowest. Beginning in time slot 1, the first reserved slot of unit A, unit A transmits a packet 710 to unit B. This transmission crosses time slot 3, which is a reserved slot for both unit B and unit C. Since unit C has higher priority than unit B, when unit A's transmission has finished, the pseudo-token is assigned to unit C, which transmits a return packet 712 to unit A. However, since the reserved slot was also missed for unit B, as soon as unit C finishes its transmission, unit B will transmit a packet 714 to unit C. Unit C then has the pseudo-token, but because unit A has a reserved slot at time slot 15, the pseudo-token is assigned to unit A, which transmits a packet 716 to unit B beginning at time slot 15. Unit B then returns a packet 718 at time slot 21. At time slot 23 the pseudo-token is assigned to unit C because of its reserved slot, and unit C transmits a packet 720 to unit A. The transmission of packet 720 by unit C crosses the reserved slot of unit B at time slot 25, which is allowed since unit C has a higher priority level than unit B. The transmission of packet 720 by unit C is completed at time slot 28, and unit A has a reserved slot at time slot 29. Therefore, the pseudo-token it assigned to A and transmission of unit B is deferred again. Only after the transmission of packet 722 by unit A has finished can unit B transmit packet 724 (at time slot 32). The communication session may continue in like fashion indefinitely.

Figure 8A:
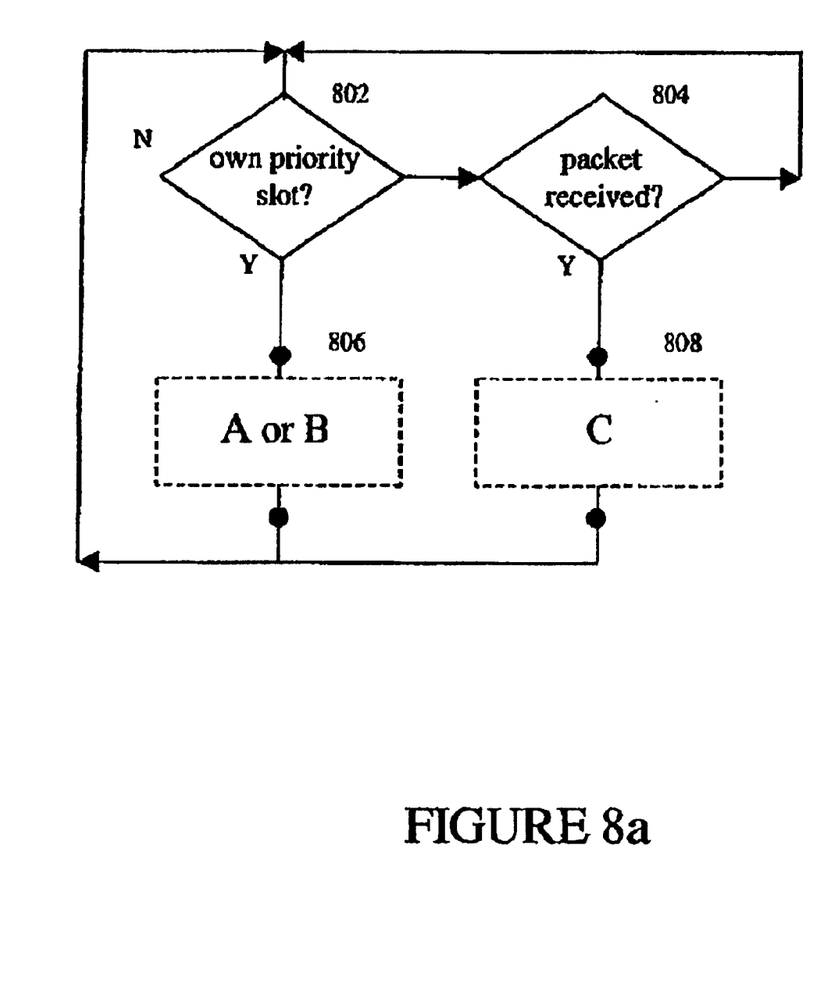
FIGS. 8a and 8b are flow diagrams of a process for contention resolution on a communication channel having priority slots in accordance with the present invention.
Figure 8B:
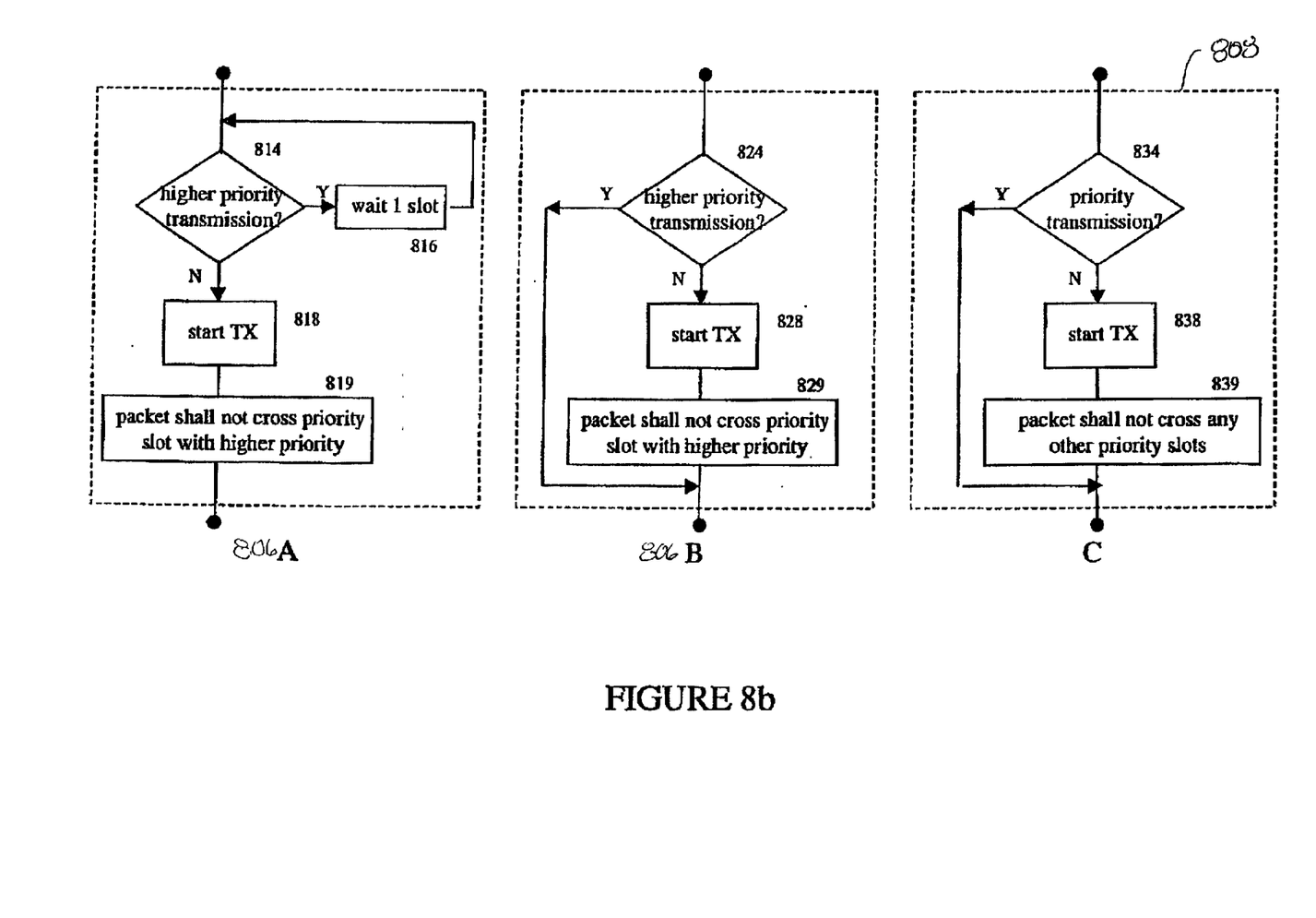

FIGS. 8a and 8b are flow diagrams illustrating a method of operating a communication unit in accordance with one aspect of the invention. It will be understood that each block of the flowchart, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Referring to FIG. 8a, at step 802, a communication unit determines whether the current time slot is the unit's own reserved slot. In an exemplary embodiment, the unit may be assigned a reserved slot sequence by another communication unit, e.g., a master unit, during the channel initialization process. Alternatively, the reserved slot sequence may be predetermined as a function of, e.g., the communication unit's network identification number. If the current time slot is the unit's reserved slot, then the communication unit enters one of two modes of operation.

In the first mode of operation, indicated at 806A in FIG. 8b, the communication unit defers its right to the pseudo-token if there is a higher priority transmission on the communication channel. Thus, at step 814 the communication unit determines whether there is a higher priority transmission on the communication channel, and if so then the communication unit waits one time slot and performs the test at step 814 again. When the channel is clear of higher priority transmissions then the communication unit begins its transmission at step 818. The communication unit's transmission is allowed to cross lower priority reserved slots, but is precluded from crossing a reserved slot of a higher priority unit (step 819). Instead, the pseudo-token will be transferred to the higher priority unit.

In the second mode of operation, indicated at 806B in FIG. 8b, the communication unit forfeits its right to the pseudo-token if there is a higher priority transmission on the communication channel. Thus, at step 824, the communication unit determines whether there is a higher priority transmission on the communication channel, and if so then control is passed back to step 802. When the channel is clear of higher priority transmissions then the communication unit begins its transmission at step 828. The communication unit's transmission is allowed to cross lower priority reserved slots, but is precluded from crossing a reserved slot of a higher priority unit (step 829). Instead, the pseudo-token will be transferred to the higher priority unit.

Referring back to FIG. 8a, if the current time slot is not the unit's reserved slot, then the unit determines whether it is in possession of the pseudo-token because it has received a packet (step 804). If not, then control passes back to step 802. If the unit is in possession of the pseudo-token, then the unit may start transmitting on the communication channel, as illustrated at step 808 of FIG. 8b. Thus, at step 834, the communication unit determines whether a deferred priority transmission on the communication channel may start, and if so then control is passed back to step 802. When the channel is clear of priority transmissions then the communication unit begins its transmission at step 838. The communication unit's transmission is not allowed to cross any reserved slots.

Accordingly, the present invention provides systems and methods for accommodating varying QoS requirements and for resolving contention contests between peer communication units accessing a communication channel. While aspects of the invention have been described in the context of a Bluetooth network and using Bluetooth terminology, it will be appreciated that the invention may be used in any cluster forming, packet switched radio network in which TDMA is used to provide channel access.

The present invention has been described with reference to particular embodiments. It will be understood that the claims are not limited to the particular embodiments described herein, but should be construed to cover structural equivalents and modifications consistent with the ordinary skill in the art. In addition, it should be emphasized that the term "comprises/comprising" when used in this specification is taken to specify the presence of stated features, integers, steps, or components but does not preclude the presence or addition of one or more other features, integers, steps, components, or groups thereof.

What is claimed is:

1. A method of allocating to communication units transmit time slots in a communication channel that implements a pseudo-token, ping-pong channel access protocol wherein a receiving unit obtains the right to transmit on the channel with the receipt of a data packet, comprising the steps of:
   allocating reserved time slots to communication units based on QoS requirements associated with the communication units, wherein the pseudo-token is automatically assigned to a communication unit during its reserved time slot;
   assigning priority levels to communication units transmitting on the communication channel; and
   interrupting the pseudo-token based channel access scheme when a communication unit's reserved time slot is overridden by a transmission from a higher priority communication unit.

2. A method according to claim 1, wherein the step of allocating reserved time slots to communication units further comprises the step of:
   receiving, at a master unit, an access request from a slave unit, wherein the access request includes QoS parameters requested by the slave unit.

3. A method according to claim 1, wherein the step of allocating reserved time slots to communication units further comprises the step of:
   allocating a maximum packet size to communication units based on QoS requests from the communication units.

4. A method according to claim 1, wherein the step of allocating reserved time slots to communication units further comprises the step of:
   assigning time offsets between the reserved time slots allocated to communication units.

5. A method according to claim 1, wherein the priority level assigned to a communication unit is based on the QoS requested by the communication units.

6. A method according to claim 1, wherein the step of interrupting the pseudo-token based channel access scheme comprises passing the virtual token to the communication unit which had its transmission time slot overridden.

7. A method according to claim 1, wherein a communication unit forfeits its right to transmit on the communication channel when its reserved time slot is overridden by a transmission from a higher priority communication unit.

8. A communication system, comprising:
   a plurality of communication units, the communication units having a transmitter for transmitting data packets on a time slotted communication channel and a receiver for receiving data packets on the time slotted communication channel, wherein one of the communications units acts as a master communication unit for implementing a pseudo-token, ping-pong channel access protocol wherein a receiving unit obtains the right to transmit on the channel with the receipt of a data packet;
   the master communication unit including:
      a module for allocating reserved time slots to at least one of the communication units based on QoS requirements associated with the communication units, wherein the pseudo-token is automatically assigned to a communication unit during its reserved time slot;
      a module for assigning priority levels to communication units transmitting on the communication channel; and
      a module for interrupting the token-based channel access scheme when a communication unit's transmission time slot is overridden by a transmission from a higher priority communication unit.

9. A communication system according to claim 8, wherein the master communication unit assigns reserved time slots based on QoS parameters requested by a slave communication unit.

10. A communication system according to claim 8, wherein the master communication unit assigns a maximum packet size to slave communication units based on QoS requests from the slave communication units.

11. A communication system according to claim 8, wherein the master communication unit assigns time offsets between the reserved time slots allocated to communication units.

12. A communication system according to claim 8, wherein the master communication unit assigns priority levels to slave communication units based on the QoS requested by the slave communication units.

13. A communication system according to claim 8, wherein the master unit interrupts the virtual token-based channel access scheme when a communication unit's transmission time slot is overridden by a transmission from a higher priority communication unit.

14. A communication system according to claim 13, wherein the master unit passes the virtual token to the communication unit which had its transmission time slot overridden.

15. A communication system according to claim 8, wherein a communication unit forfeits its right to transmit on the communication channel when its reserved time slot is overridden by a transmission from a higher priority communication unit.

16. A communication device for communicating over a communication channel that implements a pseudo-token based access scheme wherein a receiving communication device obtains the right to transmit on the channel with the receipt of a data packet, comprising:
   a transmitter for transmitting data packets directly to other communication devices on a time-slotted communication channel;
   a receiver for receiving data packets directly from other communication devices on the time-slotted communication channel; and
   a controller for controlling access to the time-slotted communication channel during a communication session with another communication device wherein the controller includes:
      a transmission time slot allocation module for allocating reserved time slots to at least one communication device based on QoS requirements associated with the communication devices, wherein the pseudo-token is automatically assigned to a communication unit during its reserved time slot;

a priority assignment module for assigning priority levels to communication devices transmitting on the communication channel; and a token assignment module for interrupting the token-based channel access scheme when a communication device's transmission time slot is overridden by a transmission from a higher priority communication device.

17. A communication device according to claim 16, wherein the transmission time slot allocation module allocates reserved time slots based on QoS parameters requested by a slave communication unit.

18. A communication device according to claim 16, wherein the controller assigns a maximum packet size to communication devices based on QoS requests from the communication devices.

19. A communication device according to claim 16, wherein the transmission time slot allocation module assigns time offsets between the reserved time slots allocated to communication devices.

20. A communication device according to claim 16, wherein the priority assignment module assigns priority levels to communication devices based on the QoS requested by the communication devices.

21. A communication device according to claim 16, wherein the token assignment module interrupts the pseudo-token based channel access scheme when a communication device's assigned transmission time slot is overridden by a transmission from a higher priority communication unit.

22. A communication device according to claim 21, wherein the token assignment module passes the pseudo-token to the communication unit which had its transmission time slot overridden.

23. A communication device according to claim 21, wherein the token assignment module forfeits a communication unit's right to transmit on the communication channel when its reserved time slot is overridden by a transmission from a higher priority communication unit.

24. A computer program product for controlling communications over a communication channel that implements a pseudo-token based access scheme wherein a receiving communication device obtains the right to transmit on the channel with the receipt of a data packet, comprising:

computer-readable storage medium having computer-readable program code means embodied in said medium, said computer-readable program code means including:

computer-readable program code means for allocating reserved time slots to at least one communication device based on QoS requirements associated with the communication devices, wherein the pseudo-token is automatically assigned to a communication unit during its reserved time slot;

computer-readable program code means for assigning priority levels to communication devices transmitting on the communication channel; and computer-readable program code means for interrupting the token-based channel access scheme when a communication device's transmission time slot is overridden by a transmission from a higher priority communication device.

25. A computer program product according to claim 24, wherein the transmission time slot allocation module allocates reserved time slots based on QoS parameters requested by a slave communication unit.

26. A computer program product according to claim 24, wherein the controller assigns a maximum packet size to communication devices based on QoS requests from the communication devices.

27. A computer program product according to claim 24, wherein the transmission time slot allocation module assigns time offsets between the reserved time slots allocated to communication devices.

28. A computer program product according to claim 24, wherein the priority assignment module assigns priority levels to communication devices based on the QoS requested by the communication devices.

29. A computer program product according to claim 24, wherein the token assignment module interrupts the pseudo-token based channel access scheme when a communication device's assigned transmission time slot is overridden by a transmission from a higher priority communication unit.

30. A computer program product according to claim 29, wherein the token assignment module passes the pseudo-token to the communication unit which had its transmission time slot overridden.

31. A computer program product according to claim 30, wherein the token assignment module forfeits a communication unit's right to transmit on the communication channel when its reserved time slot is overridden by a transmission from a higher priority communication unit.

* * * * *